(12) United States Patent
Smedley et al.

(10) Patent No.: US 9,214,811 B2
(45) Date of Patent: Dec. 15, 2015

(54) DEVICES AND METHODS FOR HARVESTING POWER FROM ARRAYS OF WIND TURBINES

(71) Applicant: CALIFORNIA INSTITUTE OF TECHNOLOGY, Pasadena, CA (US)

(72) Inventors: Gregory T Smedley, Irvine, CA (US); John Oluseun Dabiri, Pasadena, CA (US)

(73) Assignees: CALIFORNIA INSTITUTE OF TECHNOLOGY, Pasadena, CA (US); ONE-CYCLE CONTROL, INC., Irvine, CA (US)

( * ) Notice: Subject to any disclaimer, the term of this patent is extended or adjusted under 35 U.S.C. 154(b) by 455 days.

(21) Appl. No.: 13/840,007

(22) Filed: Mar. 15, 2013

(65) Prior Publication Data
US 2013/0285461 A1    Oct. 31, 2013

Related U.S. Application Data

(60) Provisional application No. 61/638,812, filed on Apr. 26, 2012.

(51) Int. Cl.
| | |
|---|---|
| H02J 3/00 | (2006.01) |
| H02J 3/36 | (2006.01) |
| H02J 3/38 | (2006.01) |
| H01B 7/30 | (2006.01) |

(52) U.S. Cl.
CPC ... *H02J 3/00* (2013.01); *H02J 3/36* (2013.01); *H02J 3/386* (2013.01); *Y02E 10/763* (2013.01); *Y02E 60/60* (2013.01); *Y10T 307/707* (2015.04)

(58) Field of Classification Search
USPC .......................................................... 307/147
See application file for complete search history.

(56) References Cited

U.S. PATENT DOCUMENTS

| | | | |
|---|---|---|---|
| 7,299,627 B2 | 11/2007 | Corten et al. | |
| 2002/0105190 A1 | 8/2002 | Thomas | |
| 2007/0114796 A1* | 5/2007 | Garces et al. | 290/43 |
| 2007/0212225 A1 | 9/2007 | Vanderhye | |
| 2010/0260604 A1 | 10/2010 | Dabiri | |
| 2012/0268081 A1* | 10/2012 | Tripathi et al. | 322/28 |

FOREIGN PATENT DOCUMENTS

| | | |
|---|---|---|
| JP | 2003328923 | 11/2003 |
| KR | 100715662 | 5/2007 |
| KR | 100737889 | 7/2007 |

(Continued)

OTHER PUBLICATIONS

Final Office Action issued for U.S. Appl. No. 12/644,677, filed Dec. 22, 2009 in the name of John Dabiri; mailed on Apr. 24, 2013.

(Continued)

*Primary Examiner* — Robert Deberadinis
(74) *Attorney, Agent, or Firm* — Steinfl & Bruno LLP

(57) ABSTRACT

Variable frequency alternate current (VFAC) bus arrangements and systems using such VFAC bus arrangements are described, such as arrays of turbines. Such systems have a centrally located power process hub connected to the VFAC bus arrangements in a way that there is a dedicated VFAC bus arrangement for each turbine of the array.

14 Claims, 6 Drawing Sheets

(56) References Cited

FOREIGN PATENT DOCUMENTS

WO    2008093921    8/2008
WO    2010117394    10/2010

OTHER PUBLICATIONS

Notice of Allowance issued for U.S. Appl. No. 12/644,677, filed Dec. 22, 2009 in the name of John Dabiri; mailed on Jun. 27, 2013.

D. Weihs, "Some Hydrodynamical Aspects of Fish Schooling," Plenum Press, pp. 703-718 (1975).

PCT International Search Report for PCT/US2009/069205 filed on Dec. 22, 2009 in the name of California Institute of Technology.

PCT Written Opinion for PCT/US2009/069205 filed on Dec. 22, 2009 in the name of California Institute of Technology.

Non-Final Office Action issued for U.S. Appl. No. 12/644,677, filed Dec. 22, 2009 in the name of John Dabiri; mailed on Nov. 7, 2012.

* cited by examiner

DEVICES AND METHODS FOR HARVESTING POWER FROM ARRAYS OF WIND TURBINES

CROSS REFERENCE TO RELATED APPLICATIONS

The present application claims priority to U.S. Provisional Application No. 61/638,812, filed on Apr. 26, 2012, which is incorporated herein by reference in its entirety. The present application may be related to U.S. patent application Ser. No. 12/644,667, filed on Dec. 22, 2009, which is published as US 2010/0260604 on Oct. 14, 2010, the disclosure of which is incorporated herein by reference in its entirety.

FIELD

The present disclosure relates to harvesting power from arrangements of turbines. More in particular, it relates to devices and methods for harvesting power from arrays of wind turbines.

SUMMARY

According to an aspect a bus arrangement for transferring electrical power is provided. The bus arrangement comprises a plurality of variable frequency alternating current (VFAC) buses, where each VFAC bus comprises a first terminal configured to be connected to a generator attached to a turbine, and a second terminal configured to be connected to an alternating current (AC) to direct current (DC) converter. In the bus arrangement, each VFAC bus is configured to transfer variable frequency alternating current (VFAC) power generated by the generator connected to the first terminal from mechanical power of the corresponding attached turbine to the AC to DC converter connected to the second terminal.

DETAILED DESCRIPTION

Figure 1:
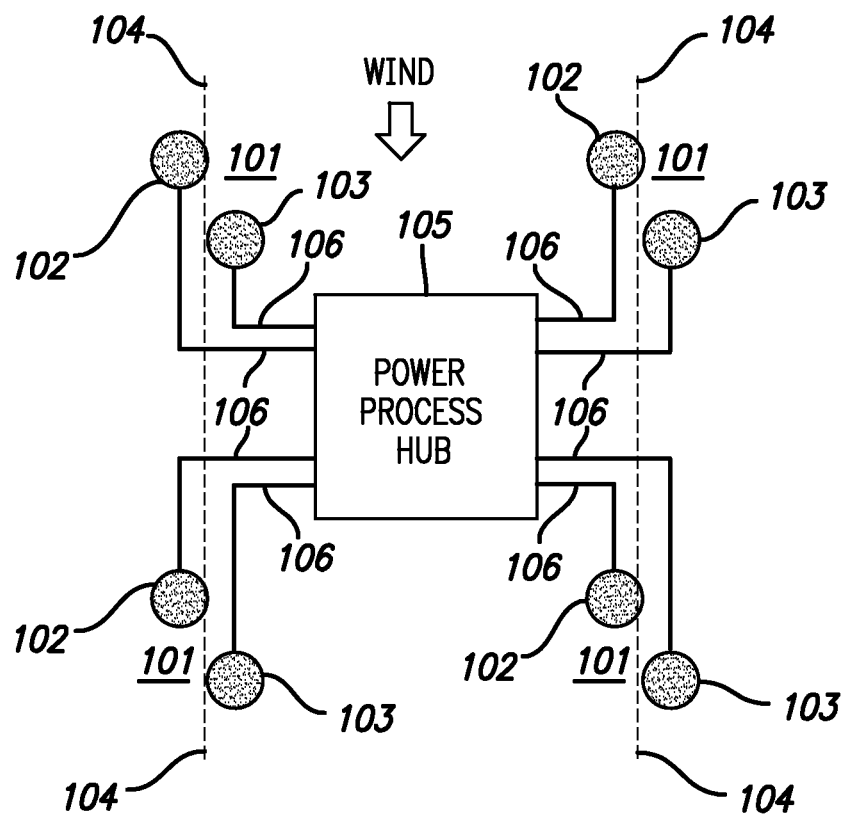
FIG. 1 shows a schematic view, where a 2×2 array arrangement of vertical axis wind turbines (VAWTs) with variable frequency alternating current (VFAC) buses is shown.

Throughout the present disclosure, embodiments and variations are described for the purpose of illustrating uses and implementations of the inventive concept. The illustrative description should be understood as presenting examples of the inventive concept, rather than as limiting the scope of the concept as disclosed herein. Like reference numerals indicate corresponding parts in various figures.

In the present disclosure, the term "output power firming" can be defined as the process of using stored energy in the energy storage to fill in low-power-generation periods or shave high-power-generation periods to enable a more stable output from an array arrangement of turbines.

In the present disclosure, estimated output power (EOP) of an entire array of turbines can be defined as an estimated power that a wind turbine array is expected to produce.

In the present disclosure, nameplate power (NP) of an array arrangement can be defined as:

NP of the array arrangement=number of turbines in the array arrangement×nameplate (rated) power of each turbine.

In the present disclosure, a node can be defined as a location within an array of turbines where 0, 1, or more wind turbines are located in a group.

In the present disclosure, variable frequency AC power is AC power that varies in frequency. For example, power generated by a variable-speed generator where frequency of the output power is proportional to a speed of rotation of the generator.

In the present disclosure, fixed frequency AC power is AC power that is at fixed frequency. For example, the United States electric grid operates at 60 Hz.

In the present disclosure, a three-phase bus can be defined as a cable in which there are three wires within a single cable or three separate wires each carrying one phase of the three-phase power. For example, three-phase power can consist of three voltage waveforms that are 120 degrees phase-shifted relative to each other and is the common form of output power from an electric generator.

Turning now to the description of the figures, according to an example embodiment of the present disclosure, FIG. 1 shows a schematic view, where a 2×2 array arrangement of vertical axis wind turbines (VAWTs) (102-103) with variable frequency alternating current (VFAC) buses (106) is shown. Although the diagram of FIG. 1 shows a 2×2 arrangement, a person skilled in the art will understand that in several other embodiments of the present disclosure single or multidimensional array arrangements of turbines can be used as well. For example, if the dimension of an array arrangement of turbine is n×n, n can represent any integer greater than or equal to one. Moreover, in several example embodiments of the present disclosure, horizontal axis wind turbines (HAWT) could be used interchangeably or in combination with the VAWTs as well. Additionally, while several embodiments of the present disclosure are directed at turbines, the person skilled in the art will also understand that the teachings of the present disclosure apply to electric power generators that may differ from turbines.

Power harvested from each individual turbine within the array arrangement could be dependent on the position of the individual turbines within the array arrangement relative to the wind direction. In the example embodiment of FIG. 1, a 2×2 square array arrangement of turbines has been considered and the wind direction has been assumed as shown by the arrow in FIG. 1.

As shown in the example embodiment of FIG. 1, each node (101) of the 2×2 array arrangement of vertical axis wind turbines (VAWTs) can comprise at least a pair of two turbines: a first turbine (102) and a second turbine (103). In some example embodiments, each node of the array arrangement of turbines (100) can comprise zero, one, two, three, four or more turbines, where the term zero is intended to mean that one or more nodes of an array can sometimes contain no turbines at all. In any square array arrangement of turbines (for example, 2×2, 4×4, 6×6 etc.), the first turbine (102) and the second turbine (103) of each node (101) of the array arrangement can have a crosswind spacing between each other, where the first turbine (102) and the second turbine (103) can be located on opposite sides of an imaginary centerline at half crosswind distance from the imaginary centerline. Reference can be made, for example, to U.S. patent application Ser. No. 12/644,667, filed on Dec. 22, 2009, which is published as US 2010/0260604 on Oct. 14, 2010, the disclosure of which is incorporated herein by reference in its entirety.

According to the example embodiment of FIG. 1, or in any square array arrangement of turbines (for example, 2×2, 4×4, 6×6 etc.) the first turbine of each node (101) of the array arrangement of turbines can be downwind staggered with respect to the second turbine (103) of that node, located on the other side of an imaginary centerline (104) between the first turbine (102) and the second (103). By way of example, in the embodiment of FIG. 1, the first turbine (102) or the second turbine (103) at each node (101) could be assumed to be spaced 12 ft apart from each other and the spacing between the nodes (101) of the array arrangement (100) could be assumed as 48 ft. Additionally, the height of each turbine in the array arrangement (100) could be assumed as 30 ft, as also noted in the above mentioned U.S. patent application Ser. No. 12/644,667, which is published as US 2010/0260604 on Oct. 14, 2010, the disclosure of which is incorporated herein by reference in its entirety.

In accordance with the present disclosure, assuming a square array arrangement of turbines, FIG. 1 further illustrates a power process hub (105) located in the center or centroid of the array, e.g. between the (n/2)th and ((n/2)+1)th rows and the (n/2)th and ((n/2)+1)th columns of the array arrangement. Individual generators (later shown in FIGS. 2 and 3) connected to the first turbine (102) or the second turbine (103) at each node (101) of the array arrangement (100) can be configured to generate variable frequency alternating current (VFAC) power (for example, in a range of 10 Hz to 800 Hz) from the mechanical power of the corresponding turbine. By way of example, permanent magnet generators can be used as generators connected to the turbines to generate VFAC power from the mechanical power of the corresponding turbine, since in a permanent magnet generator, permanent magnets move within a set of windings and can create three-phase voltage and frequency. The permanent magnet generators connected to the turbines can be commercially available or custom made for a given wind turbine. In several embodiments of the present disclosure, the amplitude and frequency of the electrical power generated by the generators connected to the turbines in the array arrangement is directly proportional to the angular speed of the corresponding turbine. The VFAC power generated at individual generators connected to each turbine of the array arrangement can be transferred to the power process hub (105) through the generators' corresponding variable frequency alternating current (VFAC) bus wires. Such generators will not be described in detail throughout the present specification because they are well known to the person skilled in the art.

According to several example embodiments of the present disclosure, each wind turbine in the array arrangement (100) can have an individual VFAC 3-phase bus (106) assigned to it, to transfer the VFAC power generated at the individual turbine to its corresponding wind-turbine-connected (WTC) power converter located at the power process hub (105), as later shown in FIG. 2. Each VFAC bus (106) can deliver, for example, 10 Hz to 100 Hz VFAC power with a corresponding range of AC voltage between 48 Vac and 480 Vac. The voltage and frequency of individual VFAC bus can change with the corresponding turbine speed or rpm. For example, the VFAC bus wiring can use 600 V, 12 AWG 3-wire cables to transfer VFAC power from each individual 3.5 kW turbine to its corresponding WTC power converter. The total number of VFAC buses in an array arrangement of turbines can be equal to the total number of turbines in that array arrangement.

Since, in several example embodiments of the present disclosure, each turbine is assumed to have small power (for example, 3-5 kW) and low rpm generators, 12 AWG wire could be used in the VFAC bus (106) to minimize the skin effect in the wires. By using 12 AWG wires, skin effect would be evident for AC frequency greater than 4000 Hz, which is substantially higher than the expected AC frequency from low-rpm turbines. A cable with three independent wires isolated from one another inside the cable, or routed as separate wires, can be used as VFAC bus wiring. Moreover, VFAC bus cables can follow a segmented path to the power process hub (105) to facilitate cable trenching.

Figure 2:
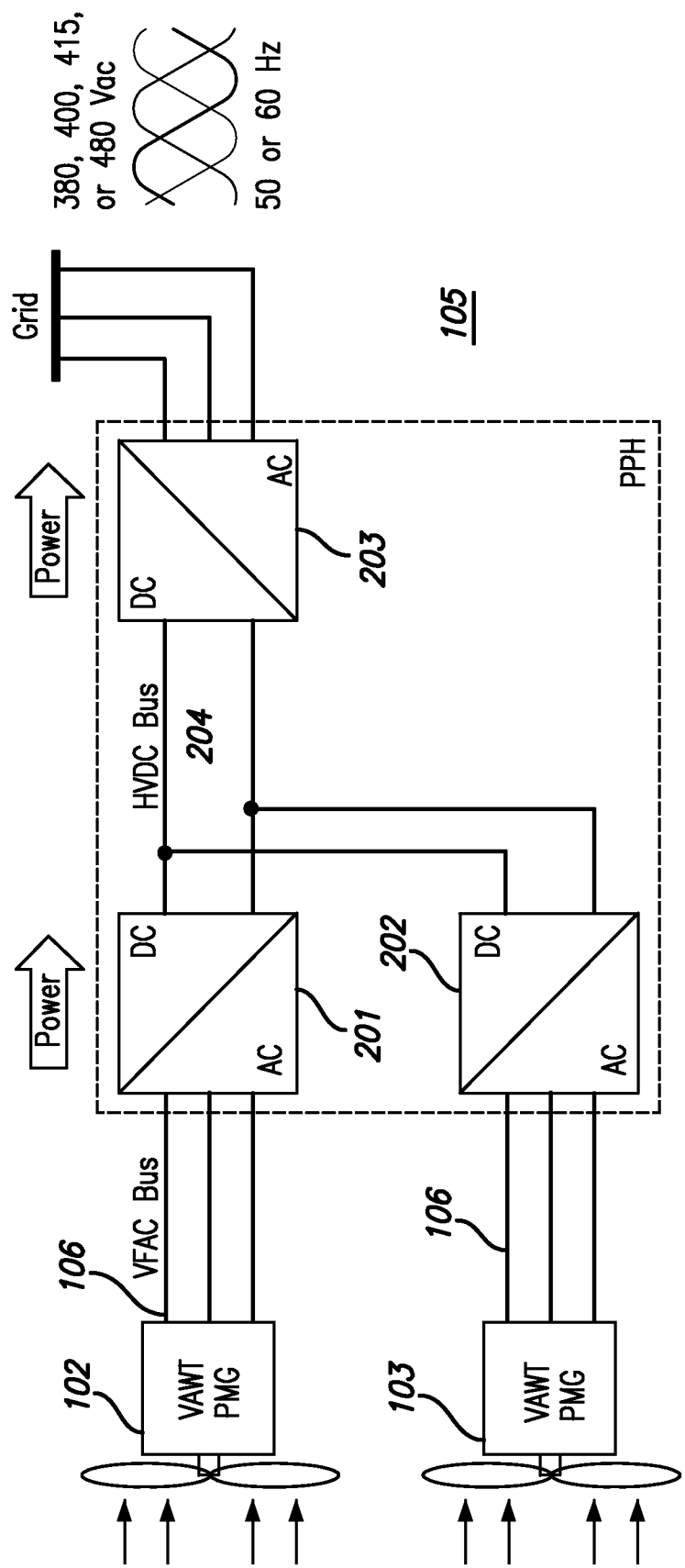
FIG. 2 illustrates the internal structure of a power process hub like the one shown in FIG. 1.

According to an example embodiment of present disclosure, FIG. 2 illustrates the internal structure of a power process hub (105) like the one shown in FIG. 1. As illustrated in the example embodiment of FIG. 2, each turbine can be associated to its own individual wind-turbine-connected (WTC) power converter located inside the power process hub (105) to convert the VFAC power generated at the generators connected to each individual turbine to high voltage direct current (HVDC) power. For example, power converter (201) converts the VFAC power from the generator connected to the turbine (102) to HVDC and power converter (202) converts the VFAC power from the generator connected to the turbine (103) to HVDC. The output voltage and frequency from each turbine can vary with speed or rpm of the corresponding turbine generator. However, less current should be conducted at lower speeds, since less power is pulled from the turbines at lower speeds.

In the example embodiment of FIG. 2, two WTC power converters (201, 202), respectively corresponding to the first turbine (102) and the second turbine (103) of any node of the array arrangement are shown. As mentioned previously, each individual turbine can have a corresponding WTC power converter located at the power process hub (105) or, in other words, the total number of turbines in an array arrangement of turbines is equal to the total number of WTC converters in the power process hub (105). The output HVDC power from each individual WTC power converter can, for example, be fed to one or more common DC to AC converters inside the power process hub (105). In the example embodiment of FIG. 2, only one of such DC to AC converters (203) is shown, which will be referred to as a grid connected (GC) power converter (203) in the present disclosure. The HVDC power from individual WTC power converters is transferred to the one or more GC power converters inside the power process hub (105) through one or more HVDC buses (204) also located inside the power process hub (105). In the example embodiment of FIG. 2, only one HVDC bus is shown. The wiring of the one or more HVDC buses (204) can be housed, for example, within a rack cabinet inside the power process hub (105) which also houses the one or more GC power converters (203). The one or more HVDC buses can operate, for example, at a fixed 800 Vdc at all power levels.

As mentioned in the previous sections, depending on the application, there could be more than one GC power converters (203) situated inside the power process hub (105). The one or more GC power converters (203) can convert the total HVDC power collected from the WTC converters to the grid-tied AC or fixed frequency AC power (FFAC) (for example, 50 Hz or 60 Hz power) suitable for the grid. Electrical buffering can be added in the power process hub (105), as connected to the HVDC bus (204) between the two stages of power conversion to enable controlled power flow to the grid independent of the power generated by the generators connected to the turbines.

Figure 3:
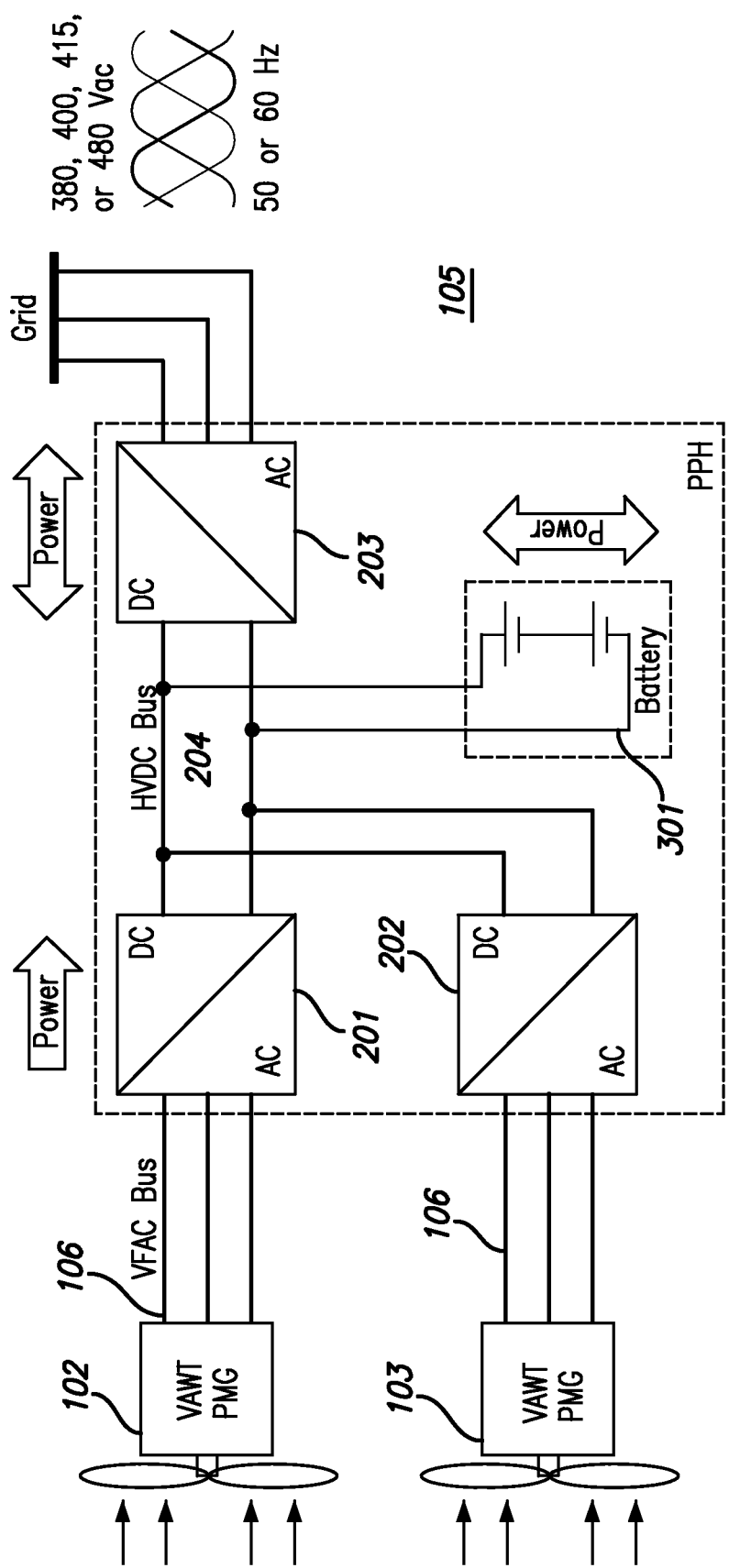
FIG. 3 illustrates the internal structure of a power process hub with an energy storage element (for example, a battery) connected to a high voltage direct current (HVDC) bus between two AC/DC and DC/AC stages of power conversion.

In accordance with a further embodiment of the present disclosure, FIG. 3 illustrates the internal structure of a power process hub (105) when an energy storage element (301) (for example, a battery) is connected to the HVDC bus (204) between the two AC/DC and DC/AC stages of power conversion. The energy storage element (301) could enable ramp control and output-power firming of the turbine array arrangement (100). In the present disclosure, the term "ramp control" can refer to the changes in the slope of increasing power delivered to the grid as the power generation from the wind turbine connected generators increases or the changes in the slope of decreasing power delivered to the grid as the power generation from the wind turbine connected generators decreases. Additionally, the energy storage could also enable buffering of harvested energy and dynamic power injection/absorption to/from the grid to stabilize power output of a co-located wind farm (for example, a horizontal axis wind turbine (HAWT) array arrangement).

According to several example embodiments of the present disclosure, in the double-conversation process (VFAC to HVDC and then HVDC to FFAC) described in the previous sections of the present disclosure, individual WTC power converters (201) could be designed to process the nameplate power (NP) of each wind turbine, but the grid-connected (GC) power converter(s) (203) could be designed to process the total estimated output power (EOP) of the array (100), since the one or more GC power converters can collectively process the output power from all of the WTC power converters. EOP is generally lower than the NP of the entire array arrangement, since the NP of the entire array arrangement=number of turbines in the array arrangement× nameplate power of each turbine. EOP of the array is dependent on the distribution of wind turbines within the array and the geographic and meteorological influences on the power produced by each wind turbine within the array.

In accordance with the present disclosure, in some embodiments, independent double-conversion of power for each turbine can enable independent optimization of power from each turbine or collective optimization of power from the entire array arrangement of turbine (100) to maximize energy harvesting. Independent double-conversion of power can be referred to 1:1 power conversion. Independent 1:1 double conversion can require that the power ratings of the WTC power converters as well as the one or more GC power converters be designed at nameplate power (NP) of the individual turbines. However, a shared N:1 double-conversion can enable multiple turbines to share the same GC power converter, so that the power rating of the one or more GC power converters can be designed according to the EOP of the entire array arrangement of turbines. Additionally, in some embodiments, N:1 double conversion can enable the use of higher-power converters for the grid-connection to reduce the dollar per watt cost of the GC power conversion. The WTC power conversion can remain configured to the nameplate power rating of each turbine (e.g. 3.5 kW). As described previously, shared N:1 double conversion is compatible with both HVDC or VFAC bus architecture.

In several example embodiments of the present disclosure, the WTC power converters and the one or more GC power converters can be selected by a person skilled in the art depending on the generator and turbine specifications in the array arrangement.

Figure 4:
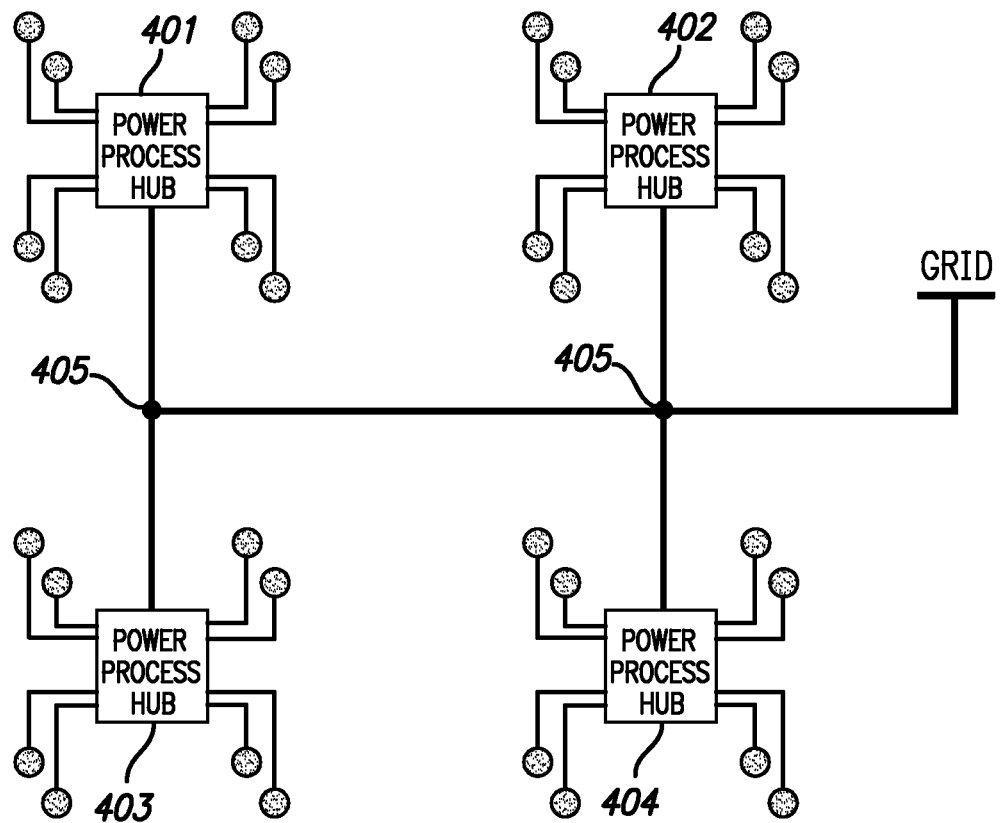
FIG. 4 shows an arrangement comprising four 2×2 sub arrays of wind turbines connected to a grid.

According to an example embodiment of present disclosure, FIG. 4 shows an arrangement of turbines comprising four 2×2 sub-arrays of turbines. In the example arrangement of FIG. 4, the fixed frequency AC (FFAC) output from the grid connected (GC) power converter of each sub-array power process hub (401, 402, 403 and 404) can be combined using standard 50/60 Hz transformers and switchgear for delivery to the main grid. Each sub-array could function as described above for the example embodiment of FIG. 1. In the example embodiment of FIG. 4, interconnection between sub-arrays can be achieved by standard 3-phase wiring common in commercial-industrial settings or in wind farms. Transformers can be used to increase the output voltage from, for example 480 Vac to 4160 Vac of each sub-array power process hub (401, 402, 403 or 404). In accordance with the several example embodiments of the present disclosure, higher voltage is suitable for longer transmission distances. The 4160 Vac from the transformers can then be combined at one or more junction boxes (405) through 4160 Vac wires. An additional step up transformer can be present to increase the voltage at the one or more junction boxes (405), for example, from 4160 Vac to 69,000 Vac to deliver to a longer high-voltage transmission line.

Figure 5:
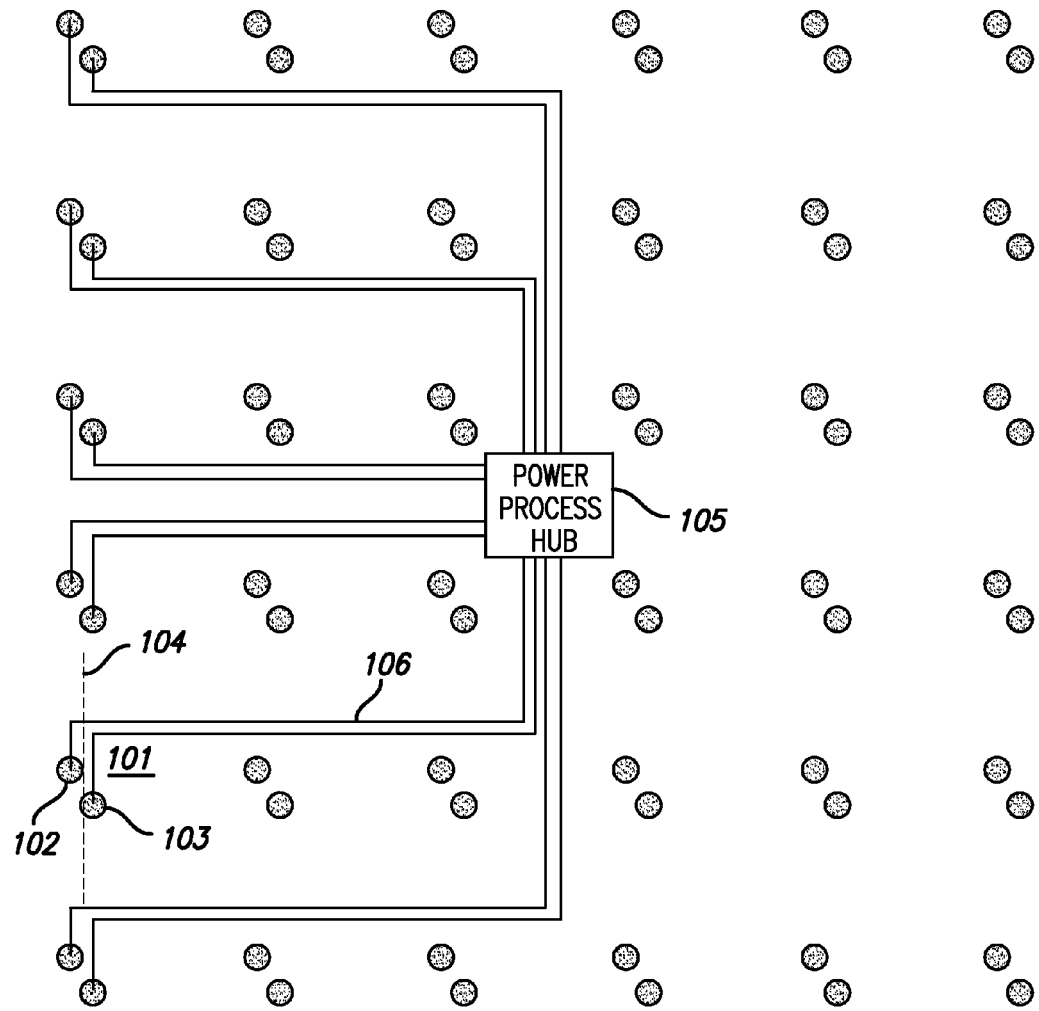
FIG. 5 shows a schematic view, where a 6×6 array arrangement of vertical axis wind turbines (VAWTs) is shown.

According to an example embodiment of the present disclosure, FIG. 5 shows a schematic view, similar to FIG. 1, where a 6×6 array arrangement of vertical axis wind turbines (VAWTs) (102-103) with variable frequency alternating current (VFAC) buses (106) is shown. It is noted that, for clarity purposes, only a few buses are shown in FIG. 5. In the example embodiment of FIG. 5, each node (101) of the 6×6 array arrangement of vertical axis wind turbines (VAWTs) can comprise a pair of two turbines: a first turbine (102) and a second turbine (103). Similar spacing considerations previously mentioned with reference to FIG. 1 can apply to the embodiment of FIG. 5.

In accordance with the present disclosure, the square array arrangement of turbines of FIG. 5 further illustrates a power process hub (105) located in the center or centroid of the array. The power process hub has been discussed in detail in the previous sections of the present disclosure in context of FIGS. 2 and 3. Individual generators (shown in FIGS. 2 and 3) connected to the first turbine (102) or the second turbine (103) at each node (101) of the array arrangement (100) can be configured to generate variable frequency alternating current (VFAC) power (for example, 10 Hz to 800 Hz) from the mechanical power of the corresponding turbine. Permanent magnet generators can be used as generators connected to the turbines to generate VFAC power from the mechanical power of the corresponding turbine, since in a permanent magnet generator, permanent magnets move within a set of windings and can create 3-phase voltage and frequency. As previously indicated, the VFAC power generated at individual generators connected to each turbine of the array arrangement can be transferred to the power process hub (105) through the generators' corresponding variable frequency alternating current (VFAC) bus wires.

Figure 6:
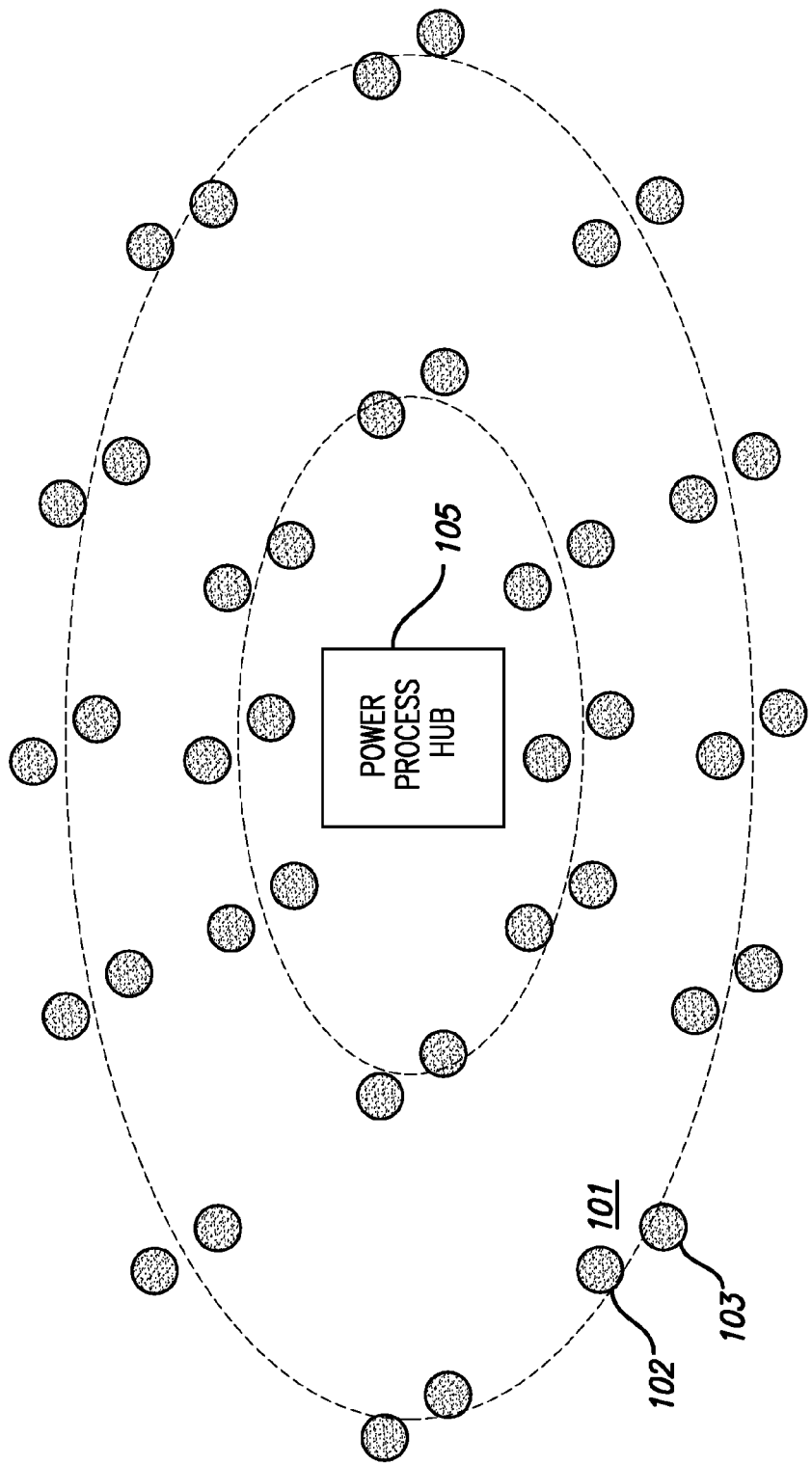
FIG. 6 shows a schematic view, where an ellipsoidal array arrangement of vertical axis wind turbines (VAWTs) is shown.

According to an example embodiment of present disclosure, FIG. 6 shows a non-square (e.g. ellipsoidal) array arrangement of turbines comprising twenty nodes, where each node (101) of the ellipsoidal array arrangement of vertical axis wind turbines (VAWTs) can comprise a pair of two turbines: a first turbine (102) and a second turbine (103). In accordance with the present disclosure, the example ellipsoidal array arrangement of turbines of FIG. 6 further illustrates a power process hub (105) located in the center or centroid of the array. Power process hub has been discussed in details in the previous sections of the present disclosure in context of FIGS. 2 and 3. Individual generators (shown in FIGS. 2 and 3) connected to the first turbine (102) or the second turbine (103) at each node (101) of the array arrangement (100) can be configured to generate variable frequency alternating current (VFAC) power (for example, 10 Hz to 800 Hz) from the mechanical power of the corresponding turbine. Permanent magnet generators can be used as generators connected to the turbines to generate VFAC power from the mechanical power of the corresponding turbine, since in a permanent magnet generator, permanent magnets move within a set of windings and can create 3-phase voltage and frequency. As previously indicated, the VFAC power generated at individual generators connected to each turbine of the array arrangement can be transferred to the power process hub (105) through the generators' corresponding variable frequency alternating current (VFAC) bus wires (not shown in FIG. 6). Dashed lines in FIG. 6, are provided for guiding the eye to show the ellipsoidal shape of the array.

While in the various figures shown in the present disclosure, every node has been shown as filled by a pair of power generation devices such as turbines, one or more of the nodes could contain a number of power generation devices that is different from the number of power generation devices of the other nodes. By way of example, a first node could be associated to two power generation devices, a second node could be associated to zero power generation devices, a third node could be associated to one power generation device, a fourth node could be associated to two power generation devices, and so on. In such example, on the power processor side, two AC/DC converters will be connected through respective VFAC buses to the first node, no AC/DC converters will be connected to the second node, one AC/DC converter will be connected through a VFAC bus to the third node, two AC/DC converters will be connected through respective VFAC buses to the fourth node, and so on.

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the devices and methods for harvesting power from arrays of wind turbines of the disclosure, and are not intended to limit the scope of what the inventors regard as their disclosure. Modifications of the above-described modes for carrying out the disclosure may be used by persons of skill in the art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A system, comprising:
an array arrangement of turbines disposed along plurality of nodes, each node associated to n turbines, with n=0, 1, 2, ith
a plurality of variable frequency alternating current (VFAC) buses, each VFAC bus comprising:
a first terminal configured to be connected to a generator attached to a turbine; and
a second terminal configured to be connected to an alternating current (AC) to direct current (DC) converter;
wherein each VFAC bus is configured to transfer variable frequency alternating current (VFAC) power generated by the generator connected to the first terminal from mechanical power of the corresponding attached turbine to the AC to DC converter connected to the second terminal,
wherein, during operation, each VFAC bus transfers VFAC power generated by the generator attached to a corresponding turbine and connected to the first terminal of the VFAC bus to the AC to DC converter connected to the second terminal of the VFAC bus, and
a power process hub, wherein each of the AC to DC converters connected to the second terminal of each VFAC bus is located inside the power process hub.

2. The system according to claim 1, wherein the power process hub is located at a center or centroid of the array arrangement of turbines.

3. The system according to claim 1, wherein the power process hub comprises:
one or more direct current (DC) to alternating current (AC) converters, wherein, during operation, each DC to AC converter is configured to convert DC power to fixed frequency AC power; and
one or more high voltage direct current (HVDC) buses, wherein, during operation, each HVDC bus transfers DC power output from the AC to DC converters to the one or more DC to AC converters.

4. The system according to claim 3, wherein the power process hub further comprises at least one energy storage element connected to the one or more HVDC buses.

5. The system according to claim 4, wherein the at least one energy storage element is a battery.

6. The bus arrangement according to claim 1, wherein each VFAC bus among the plurality of (VFAC) buses is a 3-phase bus.

7. The bus arrangement according to claim 6, wherein each VFAC bus among the plurality of (VFAC) buses uses a 12 AWG 3-wire cable.

8. The system according to claim 1, wherein amplitude and frequency of the VFAC power generated, during operation, by the generator attached to a corresponding turbine is directly proportional to angular speed of the corresponding turbine.

9. The system of claim 1, wherein the generator attached to a corresponding turbine among the first turbine or the second turbine is a permanent magnet generator.

10. A system, comprising:
an array arrangement of turbines disposed along plurality of nodes, each node associated to n turbines, with n=0, 1, 2, ith
a plurality of variable frequency alternating current (VFAC) buses, each VFAC bus comprising:
a first terminal configured to be connected to a generator attached to a turbine; and
a second terminal configured to be connected to an alternating current (AC) to direct current (DC) converter;

wherein each VFAC bus is configured to transfer variable frequency alternating current (VFAC) power generated by the generator connected to the first terminal from mechanical power of the corresponding attached turbine to the AC to DC converter connected to the second terminal, wherein, during operation, each VFAC bus transfers VFAC power generated by the generator attached to a corresponding turbine and connected to the first terminal of the VFAC bus to the AC to DC converter connected to the second terminal of the VFAC bus, and wherein each node is associated to two turbines.

11. The system according to claim 10, wherein the first turbine and/or the second turbine of each node is a vertical axis wind turbine and/or a horizontal axis wind turbine.

12. A system, comprising:

an array arrangement of turbines disposed along plurality of nodes, each node associated to n turbines, with n=0, 1, 2, ith a plurality of variable frequency alternating current (VFAC) buses, each VFAC bus comprising:
  a first terminal configured to be connected to a generator attached to a turbine; and
  a second terminal configured to be connected to an alternating current (AC) to direct current (DC) converter;
  wherein each VFAC bus is configured to transfer variable frequency alternating current (VFAC) power generated by the generator connected to the first terminal from mechanical power of the corresponding attached turbine to the AC to DC converter connected to the second terminal, wherein, during operation, each VFAC bus transfers VFAC power generated by the generator attached to a corresponding turbine and connected to the first terminal of the VFAC bus to the AC to DC converter connected to the second terminal of the VFAC bus, and wherein the VFAC power generated, during operation, by the generator attached to a corresponding turbine is dependent on position of the turbine within the array arrangement of turbines.

13. A system, comprising:

an array of power generators;

a plurality of power process hubs, each power process hub connected to a respective sub-array of the array of power generators;

a plurality of variable frequency alternating current (VFAC) buses each VFAC bus comprising:
  a first terminal configured to be connected to a generator attached to a turbine; and
  a second terminal configured to be connected to an alternating current (AC) to direct current (DC) converter;
  wherein each VFAC bus is configured to transfer variable frequency alternating current (VFAC) power generated by the generator connected to the first terminal from mechanical power of the corresponding attached turbine to the AC to DC converter connected to the second terminal, wherein, for each sub-array, each VFAC bus connects a power generator to an input of the power process hub corresponding to the sub-array; and a plurality fixed frequency alternate current (FFAC) buses connecting an output of each power process hub to a power grid.

14. The system of claim 13, wherein each power process hub is located at a center or centroid of a respective sub-array.

* * * * *